United States Patent [19]
Gabbai et al.

[11] Patent Number: 6,046,570
[45] Date of Patent: Apr. 4, 2000

[54] WAVEFORM GENERATOR AND CONTROL CIRCUIT

[75] Inventors: Yossi Gabbai; Eran Gabbai, both of Kfar Maas', Israel

[73] Assignee: Interplex Energy Ltd., Bazra, Israel

[21] Appl. No.: 08/812,660

[22] Filed: Mar. 7, 1997

[51] Int. Cl.⁷ ...................................................... H02J 7/35
[52] U.S. Cl. .......................................... 320/101; 323/906
[58] Field of Search ................................... 320/101, 102; 323/906; 136/291–293

[56] References Cited

U.S. PATENT DOCUMENTS

5,270,636  12/1993  Lafferty .................................... 320/101
5,359,280  10/1994  Canter et al. ............................ 320/101
5,479,557  12/1995  Ganz et al. .............................. 320/102
5,648,731   7/1997  Decker et al. ........................... 324/767
5,801,519   9/1998  Midya et al. ............................ 323/906

Primary Examiner—Peter S. Wong
Assistant Examiner—K. Shin
Attorney, Agent, or Firm—Kenyon & Kenyon

[57] ABSTRACT

The circuit rapidly connects and disconnects solar cells to a battery to be charged. As a result of this operation, a "force charge" is applied to the battery even when low radiation is incident on the solar cells, resulting in increased efficiency of a solar power generation system including the solar cells. For example, using the circuit according to the present invention, solar cells only have to provide one and a half times the power of the battery instead of three times the power, as with conventional solar power generation systems.

18 Claims, 5 Drawing Sheets

WAVEFORM GENERATOR AND CONTROL CIRCUIT

FIELD OF THE INVENTION

The present invention relates to a circuit for generating a desired waveform a direct current signal. More particularly, the present invention relates to a solar generator controller circuit that rapidly connects and disconnects solar cells and batteries to be charged thereby and adjusts the frequency of the generated current in accordance with changes in the radiation level incident on the solar cells.

BACKGROUND INFORMATION

In conventional solar power generation systems, the solar cells are connected to a battery to be charged via, for example, a controller circuit including a diode. These systems are generally designed to generate significant charging current even in low radiation conditions, for example, by controlling the number of solar cells used in the solar power systems. In such a conventional system, the power generated by the solar cells must be, for example, three times the power needed to charge the battery. For example, a conventional solar cell, when charged, provides approximately 0.45 volts at its output. A number of solar cells can be joined together in order to provide the desired output voltage. Thus, to power a 10 Watt device, for example, the battery designed for the device would be 20 Watts and the solar cells providing power to the battery would be three times the size of the battery, e.g., 60 Watts. The appropriate number of solar cells would be assembled to provide the 60 Watt output.

The relative size, number and arrangement of the solar cells is selected in order to gain sufficient current in the direction of the battery. The size of the solar cell relates to the current generated by the solar cell while the number and arrangement of the solar cells relate to the voltage of the solar power system. While the size of the solar cells can be increased to get the desired current, the cost of solar cells are relative to the size. Therefore, for solar cells of moderate size and/or designed for limited space applications (e.g., a small lighting device used as lane markers on a highway), if there is low radiation on the solar cells, e.g., a cloudy day, then an insufficient amount of current is generated by the solar cells to provide charge in the direction of the battery.

Solar cells achieve maximum voltage even in a low radiation condition when in an open circuit condition, e.g., when not connected to a battery to be charged, with each standard solar cell providing an approximately 0.45 volt output. In a conventional system, however, where the solar cells are connected to the battery via a diode connection, the voltage generated by the solar cells when there are low levels of radiation on the solar cells falls immediately from the voltage of the solar cells (e.g., Vcc) to the voltage of the battery. As an example, if twelve solar cells were provided to charge a 2 volt battery, the solar cells would output approximately 6 V (12×0.45 V), which is approximately three times the voltage of the battery. In a low radiation situation, the output of the solar cells is connected to the battery and the voltage of the output will fall from approximately 6 V to the voltage of the battery, e.g., 2 V. After the voltage of the solar cells falls to the voltage of the battery, an equilibrium situation arises with the voltage of the solar cells equaling that of the battery plus the voltage drop over the diode. After this time, the equilibrium situation results in effectively no current being generated in the direction of the battery. For example, using the diode connection, only one spark is generated, for the duration of the time of the voltage to fall from Vcc to Vbat, thus limiting the charging current to the battery, and then the circuit remains in the equilibrium condition with no further charging of the battery and no means for disconnecting the solar cells to regain their maximum voltage. Accordingly, in order to generate enough current to charge the battery, the number of the solar cells must be increased, thereby increasing costs, complexity, space requirements, etc.

In addition, in a solar power system designed for a low radiation situation that is then exposed to high radiation levels, the conventional diode connection between the solar cells and the battery to be charged provides a charging voltage, which is higher than the voltage of the battery, at a high current which can damage the battery to be charged. Even in a conventional solar power system designed to provide a charging voltage at low levels of radiation that is within 10% of the voltage of the battery, for example to charge a Nickel-Cadmium battery, such a system would provide too much charging current in a high radiation situation. For example, the high charging current resulting from a high level of radiation incident on the solar cells can heat the battery junction and shorten the life of and possibly ruin the battery. In addition, the high charging current is a constant current that can also be harmful to the battery, particularly when the battery has reached its capacity and the charging current is still being provided. Thus, prior art solar power systems required a design for either low or high levels of incident radiation, but a single such system will not work in both types of radiation situations.

SUMMARY OF THE INVENTION

According to the present invention, instead of a diode connecting the solar cells to the battery to be charged, a circuit according to the present invention provides the connection and rapidly connects and disconnects the solar cells and the battery. As a result of this operation, a "force charge" is applied to the battery even with low radiation incident on the solar cells, resulting in increased efficiency of energy generation by the solar cells. For example, using the circuit according to the present invention, solar cells provide numerous peak current pulses to the battery to be charged, thereby providing sufficient current in the direction of the battery to charge the battery while only having to provide, for example, one and a half times the power of the battery instead of three times the power, as with conventional solar power generation systems. Moreover, as the frequency of the current provided from the solar cells can be controlled as a function of the level of incident radiation on the solar cells, a single solar power system according to the present invention can be used in both low and high incident radiation situations.

DETAILED DESCRIPTION OF THE INVENTION

Figure 1:
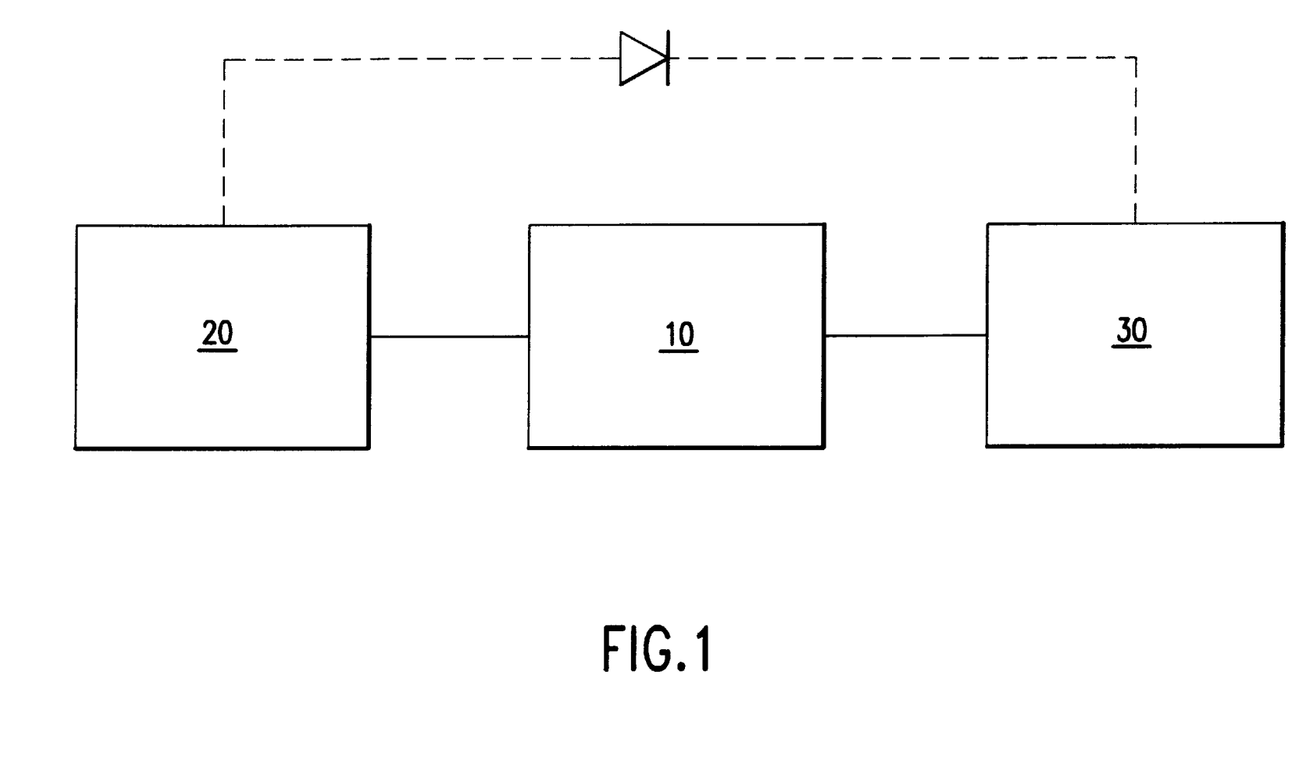
FIG. 1 shows a block diagram illustrating a solar power generating system according to the present invention.

FIG. 1 illustrates a block diagram of a solar generator system according to the present invention in which waveform generator circuit 10 connects a collection of solar cells 20 to the battery 30 to be charged. The circuit 10 rapidly connects and disconnects the solar cells 20 to the battery 30. For example, the circuit 10 generates a frequency as a function of the radiation level incident on the solar cells 20 and connects and disconnects the solar cells to the battery 30 at the frequency. As a result of this operation, a "force charge" is applied to the battery 30 even when low radiation is incident on the solar cells 20, thereby resulting in increased efficiency of the solar cells 20. For example, using the waveform generator circuit 10 according to the present invention, solar cells 20 only have to provide one and a half times the power of the battery 30 instead of three times the power, as with conventional solar cell systems.

In a conventional solar power generation system in which there is low radiation incident on the solar cells 20, the output voltage of the solar cells 20 drops from a fully charged value (e.g., approximately 0.45 V per solar cell) to the voltage of the battery 30 in approximately 0.5 msec. Thus, for this time period, a single spark is generated and there is current gain in the direction of the battery 30. In a solar power generation system without the circuit 10 according to the present invention, this current gain to the battery 30 is transmitted via a diode 100 (shown in outline in FIG. 1) connecting the solar cells 20 and the battery 30, the diode 100 replacing the circuit 10. On the other hand, using the waveform generator circuit 10 according to the present invention, which rapidly connects the disconnects the solar cells 20 to the battery 30 as described in detail below, the current gain in the direction of the battery 30 is increased to the peak current value times the frequency created by the circuit 10. In addition, it has been determined that using a frequency slightly wider than the duty cycle ensures that all of the voltage generated by the solar cells 20 is applied to the battery 30, as the wider frequency allows the voltage of the solar cells 20 to be completely discharged and the equilibrium situation achieved between the voltage of the solar cells 20 and the voltage of the battery 30 before the solar cells are disconnected and allowed to return to their peak value. For example, if the discharge time is 0.5 msec, during which time the voltage of the solar cells 20 drop to the voltage of the battery 30, a frequency of 1.7 kHz can be selected, which is slightly wider than the frequency of the 0.5 msec discharge time, thereby ensuring that the full capacity of the solar cells 20 is discharged prior to disconnecting the solar cells 20 from the battery 30. For example, a few microseconds can be added to the discharge time before selecting the frequency in order to achieve optimal discharge and charging of the solar cells 20 and battery 30.

Even in a low radiation condition, the solar cells 20 quickly attain their maximum voltage when the solar cells 20 are in an open circuit condition. Thus, while the peak voltage for each of the solar cells 20 is achieved only during the discharge time in conventional systems, the circuit 10 according to the present invention takes advantage of the available maximum voltage level of the solar cells 20 available by disconnecting the solar cells 20 from the battery 30. Thus, the circuit 10 according to the present invention rapidly connects and disconnects the solar cells, thereby making more peak voltage levels available for charging a battery 30 via, for example, generating a frequency slightly wider than the duty cycle (e.g., 1.7 kHz) for charging the battery 30. In addition, as the waveform generator circuit 10 can use a integrated circuit transistor, such as CMOS transistor, the circuit 10 utilizes less energy than, for example, the energy dissipated in the diode 100 used in conventional solar power generation systems.

Figure 2:
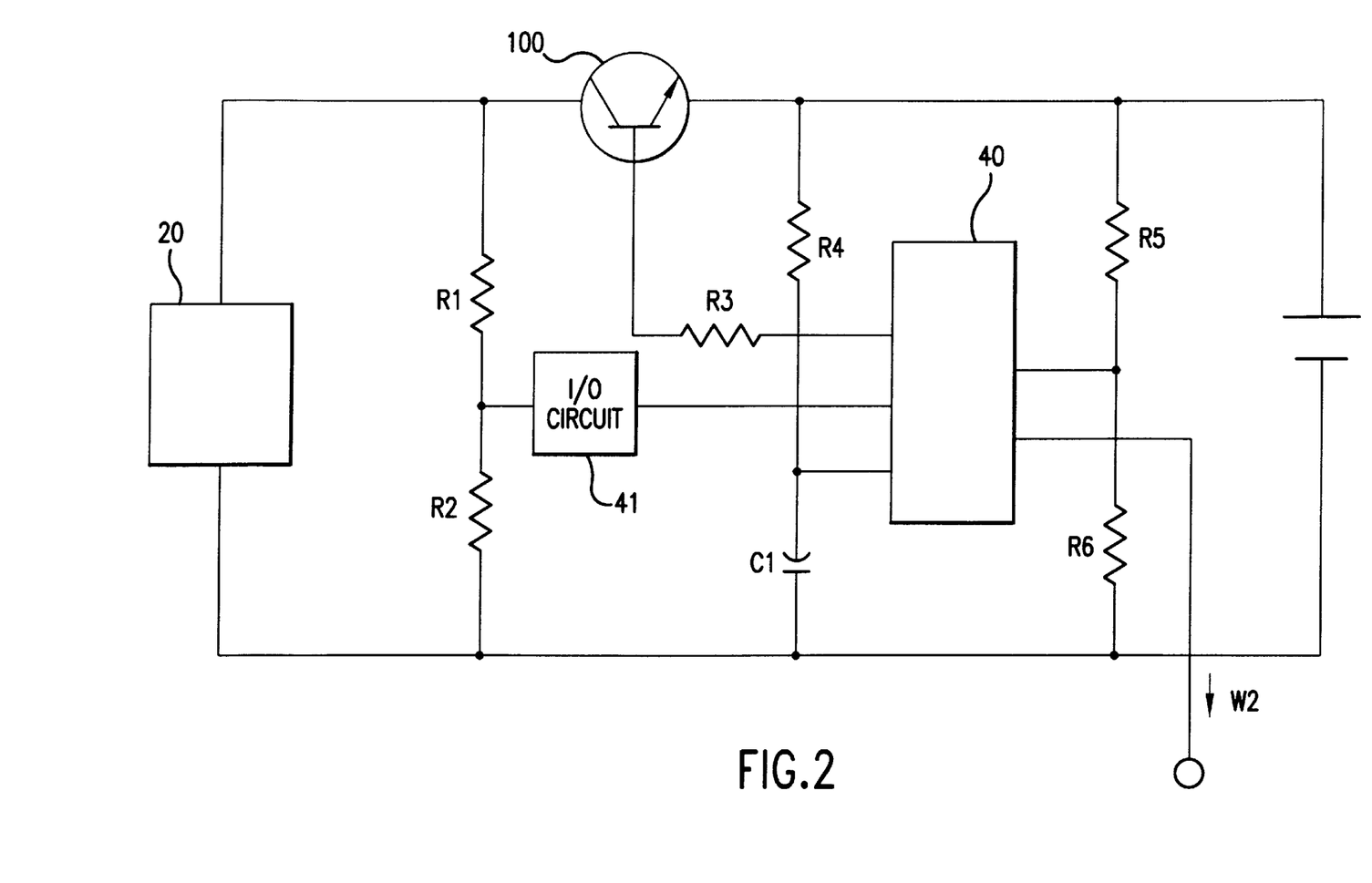
FIG. 2 shows a waveform generator circuit according to the present invention.

As illustrated in FIG. 1 and shown in detail in the waveform generating circuit illustrated in FIG. 2, the waveform generator circuit 10 according to the present invention includes a controller 40, for example, a microprocessor based device, for example, a PIC 16C54A one time programmed (OTP) chip manufactured by Microchip Technology, Inc. of Chandler, Ariz. The controller 40 determines the frequency that the peak current gain from the solar cells 20 is to be provided to the battery 30 as a function of the radiation levels incident on the solar cells 20.

In the waveform generating circuit shown in FIG. 2, the controller 40 is connected to a transistor 100, for example a CMOS transistor, via resistor R3. Transistor 100 is controlled by the controller 40 to connect and disconnect the solar cells 20 to the battery 30 via a first waveform signal W1. A voltage divider formed by resistor R1 and R2 across the voltage of the solar cells 20 provides an input voltage to the controller 40. A timing circuit formed by resistor R4 and capacitor C1, such as are known in the art, provides a timing input to the controller 40 in the range of, for example, a several kHz timing signal. As a function of the input voltage from the R1/R2 voltage divider indicating the level of radiation incident on the solar cells 20, the controller 40 determines whether to turn transistor 100 on or off, as described in more detail below. A second voltage divider formed by resistors R5 and R6 monitors the voltage of the battery 30 and provides an input voltage to the controller 40 as a function of which the controller 40 determines whether power can be delivered from the battery 30 via a second waveform signal W2. For example, the controller 40 can monitor the voltage level of the battery 30 and only allow the voltage of the battery 30 to drop to 20% of its capacity thereby preventing the battery 30 from completely discharging and prolonging the life of the battery 30 by, for example, inhibiting the second waveform signal W2.

The frequency at which the transistor 100 is turned on and off can be controlled, for example, by controller 40. As indicated above, the output of the R1/R2 voltage divider indicates the level of radiation incident on the solar cells 20. The output voltage is input to the controller 40, via for example, an I/O circuit 41 including, for example a comparator or an A/D converter. For example, using the comparator, the input voltage can be compared to a threshold voltage. If the input voltage exceeds the threshold voltage, indicating a high level of radiation incident on the solar cells 20, then a relatively low frequency can be selected, for example 1 Hz, thus providing the peak current from the solar cells 20 to the battery 30 in pulses, thereby providing safer charging of the battery 30 than with direct current charging. If the input voltage is less than the threshold voltage, then a higher frequency can be selected, for example 1.7 kHz, thereby providing increased charging efficiency as described above. In addition, it is also possible to have a more dynamic frequency selection as a function of the radiation level incident on the solar cells 20. For example, by connecting the input voltage from the R1/R2 voltage divider to an A/D converter in the I/O circuit 41, the input voltage can be converted to a digital value which is then used as a pointer in a look up table included in the controller 40. The look-up table, as is known in the art, can contain frequencies for various radiation levels incident on the solar cells 20. It is noted that while the solar cells 20 generally provide a 0.45 volt output, the voltage does vary somewhat as a function of the level of incident radiation which variation can be detected by the A/D convertor and look-up table. In addition, the use of the look-up can account for additional factors such as the size of the solar cells 20 and the characteristics of the battery 30 as well as the radiation profile.

Figure 3:
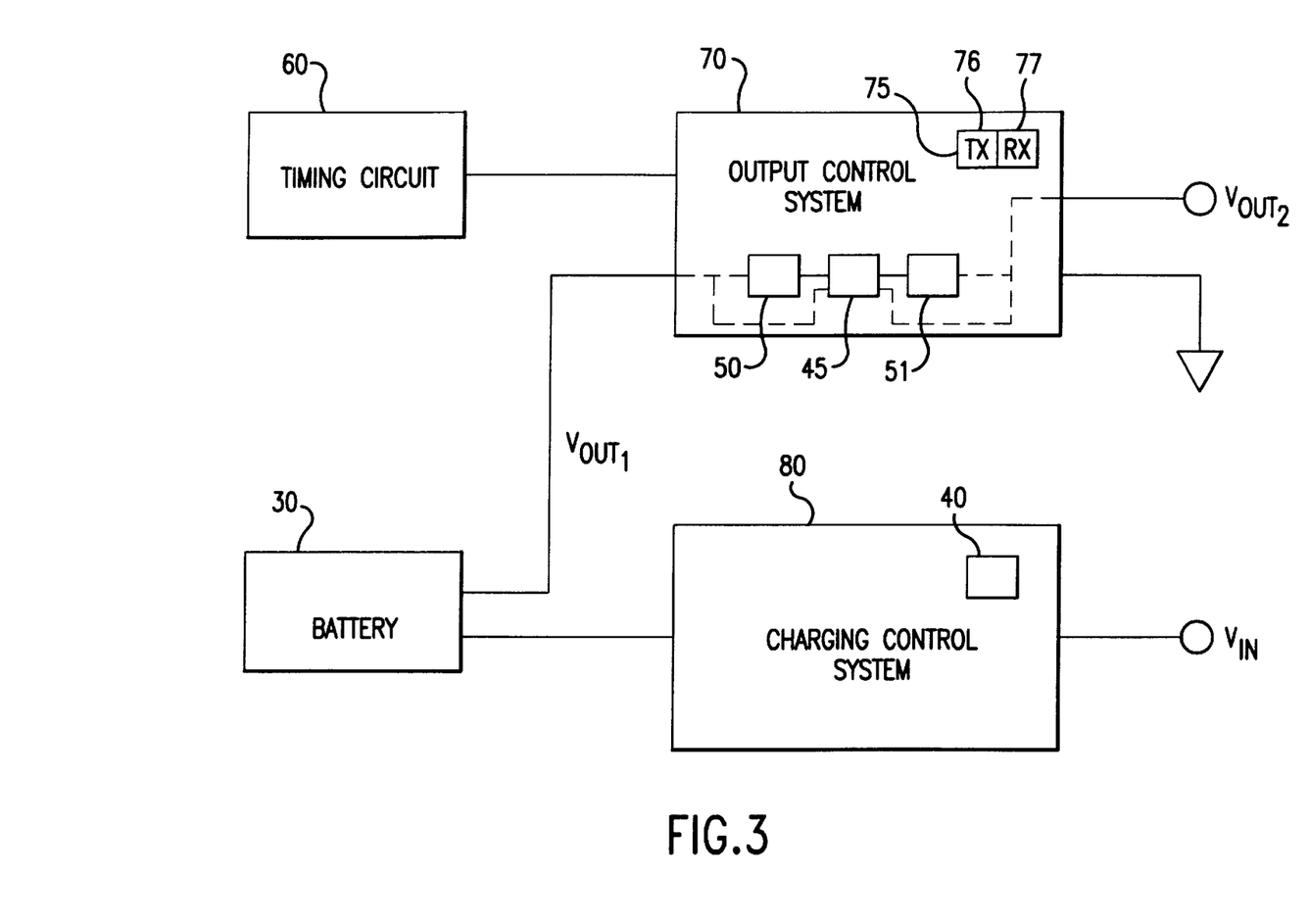
FIG. 3 shows another waveform generator circuit according to the present invention.

As shown in FIG. 3, the waveform generator circuit according to the present invention includes a charging control system 80 similar to the waveform generator circuit described in FIG. 2 connected to an input voltage Vin, such as solar cells 20, and also has a first output voltage Vout1 connected to the battery 30 for charging the battery 30. In addition, an output control system 70 is connected to the battery 30 and to a timing circuit 60. The timing circuit 60 provides a timing signal 61 to the output control system 70 in a known manner using, for example, an 8 MHz crystal oscillator.

When an output voltage from the battery 30 is desired, the output control circuit 70 receives an input voltage from the battery 30, at the rate determined by the timing circuit 60 via timing signal 61. The input voltage from the battery 30 is a direct current signal. The controller circuit 45, for example a microprocessor based controller circuit similar to controller 40, determines the format for the output voltage Vout2 from the output control circuit 70. Similar to the manner of selecting a frequency for the input voltage from the solar cells 20 to charge the battery 30, the controller 45 can select a frequency to apply to the direct current from the battery 30 to create an output waveform of desired shape. For example, any desired waveform can be selected as a function of the desired operation by preprogramming the format of the output signal. For example, the output signal may be used to drive various light emitting diodes of a lighting circuit. Accordingly, the frequency of the outputted signal can be selected in accordance with a desired mode of operation, including a sequencing of sets of LEDs as well as controlling the duration of lighting for each of the sets of LEDs, as described, for example, in the attached Appendix of source code.

In addition, a D/A convertor 51 can initially process the direct current signal from the battery 30 so that the signal is in a digital format for processing by the output control system 70 (e.g., applying the desired frequency, shape and amplitude to the digital signal as is known in the art). Then the processed digital signal can be passed through a D/A convertor 51 to generate the desired output voltage Vout2. For example, the processing of the direct current signal from the battery 30 can include converting the direct current signal to an alternating current signal at a desired frequency and amplitude and can also include varying the shape of the waveform via appropriate programming of the software in the programmable controller 45.

The combination of the A/D convertor 50, controller 45 and D/A convertor 51 allows the programmable controller 45 to control the switching on and off of the signal from the battery 30 at prescribed intervals to generate a practically infinite number of output waveforms. Thus, for example, a 12 volt DC signal (for example, as the output of twenty-four solar cells 20) can be received from the battery 30, processed by the A/D convertor 50 and then further processed by the controller 45 which can control the switching on and off of, for example, 254 times for different durations to create desired waveform outputs. Accordingly, the apparatus and method according to the present invention provide for gating an input signal to obtain a desired output signal. One such application for the method and circuit according to the present invention is for controlling a solar power generator system, as described above.

In an embodiment of the present invention, various programs for controlling the charging of the battery 30 can be included in the programmable controller 40 and various programs for controlling the output of the waveform from the battery can be included in the programmable controller 45. For example, there is adequate ROM in the controllers 40, 45 to store multiple programs for controlling numerous types of output devices attached to the waveform generator according to the present invention. As mentioned previously, the controllers 40, 45 can include an OTP microprocessor so that, for example, a conventional external device can be used to select one of the stored programs.

Figure 4:
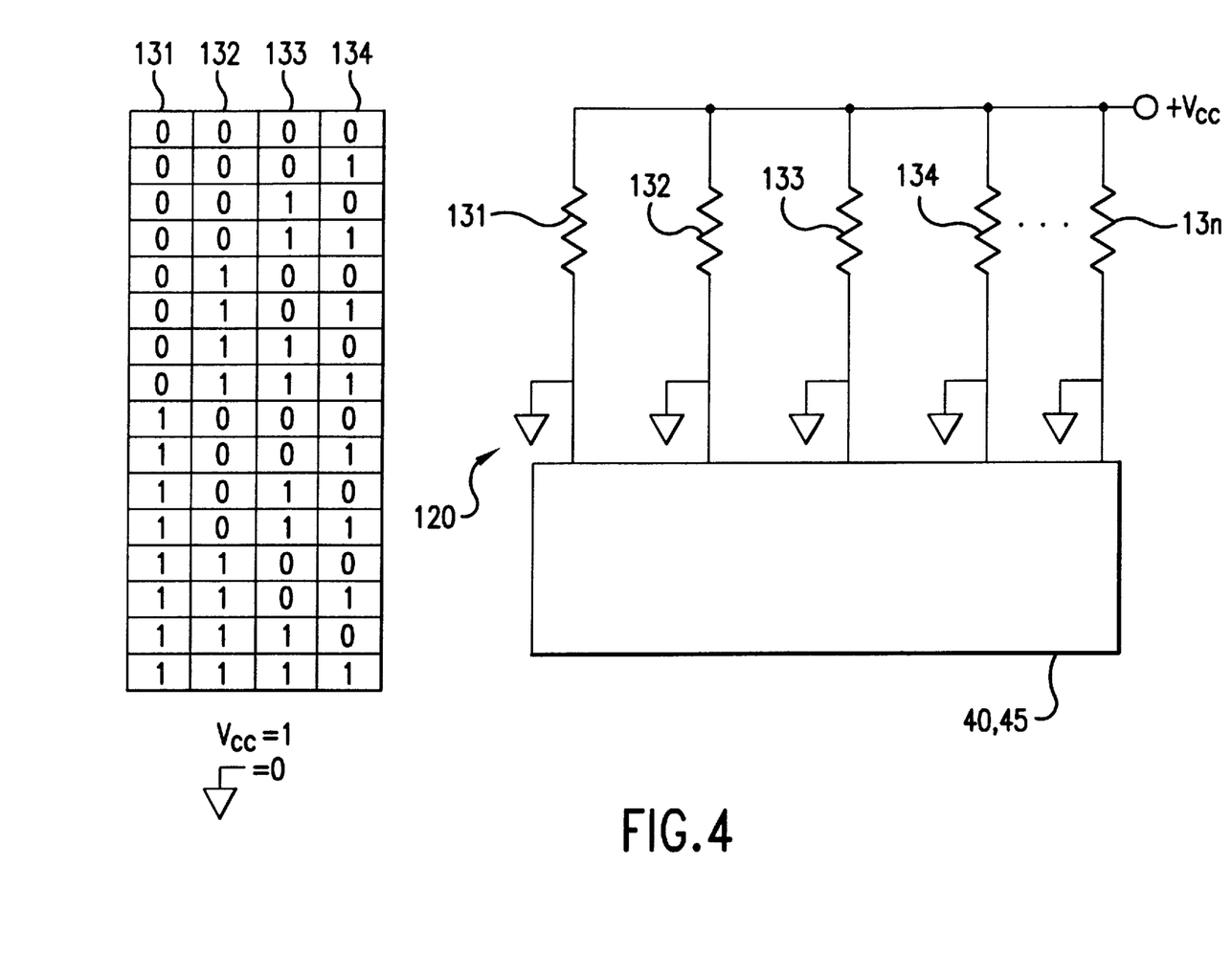
FIG. 4 shows a controller according to the present invention which cooperates with a conventional device.

As shown in FIG. 4, such a conventional device 120 can be used to activate, for example, one of sixteen programs stored in the controller 40 or the controller 45. The device 120 includes, for example, four resistors 131, 132, 133, 134 connected in parallel to a power supply Vcc and to ground. It is also possible to have additional resistors 13n as desired. Device 120 operates as follows. Each of the terminals of the resistors 131, 132, 133, 134 connected to ground is at a low state, e.g., a logical 0. By disconnecting the ground connection of a resistor 131, 132, 133, 134, the state of the particular resistor is changed to a logical 1 as the resistor is also connected to Vcc. Therefore, addresses 0000 to 1111 can be individually selected by appropriately controlling the ground connections of the resistors 131, 132, 133, 134. Accordingly, one of sixteen addresses can be selected. Moreover, as the controllers 40, 45 are OTP chips, only one program can be selected. Correspondingly, the programs stored in the ROM of controllers 40, 45 can be individually selected by applying the selected address of the program on the resistor connections which are then placed in the appropriate pin connections on the chip for controllers 40, 45. The selection of a particular program in the manner described above initializes the selected program in the respective controller 40, 45 as is known the art.

In another embodiment of the present invention, an ultrasonic transceiver 75 including an ultrasonic transmitter 76 and ultrasonic receiver 77 is included in the output control system 70 as shown in FIG. 3. The ultrasonic transmitter 76 and receiver 77 can include, for example, conventional ultrasonic diodes. By using the ultrasonic transmitter 76 and receiver 77 in a device utilizing the waveform generator circuit according to the present invention, the triggering of the output voltage Vout2 can be further controlled by the ultrasonic transceiver 75. For example, in a first device using the waveform generator circuit 10 and the ultrasonic transceiver 75, a second device also using the waveform generator circuit 10 and the ultrasonic transceiver 75 can be activated by the first device.

Figure 5:
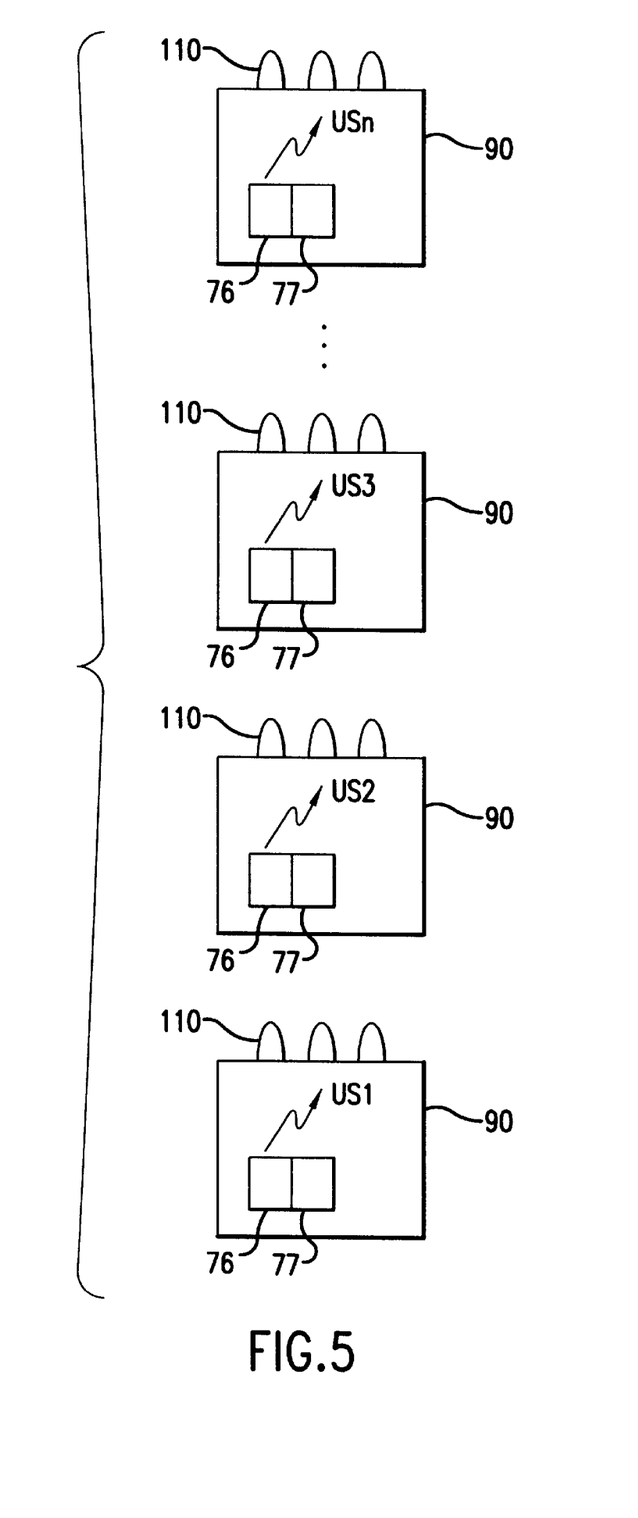
FIG. 5 shows an exemplary application of an embodiment according to the present invention.

An exemplary application of this embodiment of the present invention is in highway lighting devices, such as lane markers, wherein a plurality of devices 90 incorporating the waveform generator according to the present invention which drive a set of LEDs 110 in a predetermined manner are arranged along the highway, as illustrated in FIG. 5. With no connection between the plurality of devices 90, there is no synchronization of the lighting of the LEDs 110. However, using the ultrasonic transceiver 75 according to the present invention, synchronization between the plurality of devices 90 can be achieved. For example, an initial ultrasonic signal US1 from the ultrasonic transmitter 76 in a first of the plurality of devices 90 can be sequentially received by the ultrasonic receiver 77 in the next of the plurality of devices 90, as illustrated in FIG. 5. Similarly, receipt of the signal US1 in the next device 90 causes another ultrasonic signal US2 to be transmitted from the next device 90 to the next sequential device 90, and so on until the last of the plurality of devices 90 transmits the ultrasonic signal Usn.

The ultrasonic receiver 77 receives an ultrasonic signal and outputs a signal, for example, to the programmable controller 45 indicating receipt of the ultrasonic signal from a prior device 90. For example, the ultrasonic receiver 77 can provide an interrupt signal to the controller 45 causing the controller 45 to initiate a cycle of blinking of the LEDs 110 in the manner described above (e.g., processing of the direct current signal from the battery 30 to generate Vout2). The controller 45 then sends a signal to the ultrasonic transmitter 76 causing the ultrasonic transmitter 76 to send an ultrasonic signal to the next device 90. The ultrasonic signal Usn can also be detected by a satellite system in order to detect and control the status of the devices 90.

The circuit 10 according to the present invention that creates the frequency of the current gain from the solar cells 20 by rapidly switching the connection of the solar cells 20 and the battery 30 on and off also costs less than conventional approaches to create alternating current signals from DC signals. For example, to gain 50 Hz in a system that is a high voltage system, e.g. 110V–220V, from a direct current signal requires large devices including capacitors, transformers and other heavy equipment which are expensive and generate significant heat. In contrast, the circuit 10 according to the present invention avoids such problems.

What is claimed is:

1. A solar power generator system, comprising:
   at least one solar cell, the at least one solar cell generating a first signal as a function of incident radiation;
   a voltage divider circuit coupled to the at least one solar cell and generating a voltage signal as a function of the first signal; and
   a control circuit coupled to the at least one solar cell, the control circuit receiving the voltage signal, generating a second signal as a function of the voltage signal and processing the second signal via a microcontroller to generate a control signal, the control signal being provided to control charging of a battery connected to the control circuit, wherein the control circuit connects and disconnects the first signal to the battery at a predetermined rate using the control signal.

2. A solar power generator system, comprising:
   at least one solar cell, the at least one solar cell generating a first signal as a function of incident radiation; and
   a control circuit coupled to the at least one solar cell, the control circuit generating a second signal as a function of the first signal and processing the second signal via a microcontroller to generate a control signal, the control signal being provided to control charging of a battery connected to the control circuit, wherein the control circuit connects and disconnects the first signal to the battery at a predetermined rate, and wherein the predetermined rate is determined as a function of a level of the incident radiation.

3. The solar power generator system according to claim 2, wherein the predetermined rate is determined as a function of the level of the incident radiation exceeding a threshold value.

4. The solar power generator system according to claim 3, wherein, when the level of incident radiation is below the threshold value, the predetermined rate is higher than the predetermined rate, and wherein, when the level of incident radiation exceeds the threshold value, the threshold rate is equal to or greater than the predetermined rate.

5. The solar power generator system according to claim 3, wherein, when the level of incident radiation is below the threshold value, the predetermined rate is in a range of 1.0 to 2.0 kHz, and wherein, when the level of incident radiation exceeds the threshold value, the predetermined rate is in a range of 1 Hz to 1.0 kHz.

6. The solar power generator system according to claim 5, wherein, when the level of incident radiation is below the threshold value, the predetermined rate is 1.7 kHz and wherein, when the level of incident radiation exceeds the threshold value, the predetermined rate is 1 Hz.

7. A solar power controller circuit, comprising:
   an input portion receiving an input signal from a solar cell and generating an output signal;
   a voltage divider portion coupled to the input portion and generating a voltage signal as a function of the output signal; and
   a control portion coupled to the input portion via the voltage divider portion, the control portion generating a first waveform control signal as a function of the voltage signal via a microcontroller, the control portion applying the first waveform control signal to the input signal to charge a storage battery, the input signal being processed as a function of a level of incident radiation on the solar cell, the control portion connecting and disconnecting the input signal to the battery at a predetermined rate via the first waveform control signal.

8. The solar power controller circuit according to claim 7, wherein a duration of the first waveform control signal determines a shape of the input signal provided to the battery.

9. A solar power controller circuit, comprising:
   an input portion receiving an input signal from a solar cell and generating an output signal; and
   a control portion coupled to the input portion, the control portion processing the output signal via a microcontroller to generate a first waveform control signal applied to the input signal to charge a storage battery, the processing of the input signal being determined as a function of a level of incident radiation on the solar cell, the control portion connecting and disconnecting the input signal to the battery at a predetermined rate via the first waveform control signal, wherein the microcontroller determines the predetermined rate as a function of the level of incident radiation.

10. A solar power controller circuit, comprising:
    an input portion receiving an input signal from a solar cell and generating an output signal;
    a control portion coupled to the input portion, the control portion processing the output signal via a microcontroller to generate a first waveform control signal applied to the input signal to charge a storage battery, the processing of the input signal being determined as a function of a level of incident radiation on the solar cell, the control portion connecting and disconnecting the input signal to the battery at a predetermined rate via the first waveform control signal; and
    an output control system coupled to the storage battery and to a timing circuit, the output control system including a second microcontroller and generating a second output signal, the second output signal having a predetermined waveform and being generated as a function of a signal from the storage battery being processed by the second microcontroller.

11. The solar power controller according to claim 10, wherein the output control system further includes an analog to digital convertor receiving the signal from the storage battery and providing a digital voltage to the second microcontroller and the output control system also includes a digital to analog convertor connected to the second microcontroller, the digital to analog convertor providing the second output signal, and wherein the second microcontroller is programmed to form the predetermined waveform via a second waveform control signal applied to the digital voltage.

12. A solar power controller circuit, comprising:
an input portion receiving an input signal from a solar cell and generating an output signal;
a control portion coupled to the input portion, the control portion processing the output signal via a microcontroller to generate a first waveform control signal applied to the input signal to charge a storage battery, the processing of the input signal being determined as a function of a level of incident radiation on the solar cell, the control portion connecting and disconnecting the input signal to the battery at a predetermined rate via the first waveform control signal; and
an output control system coupled to the storage battery and to a timing circuit, the output control system including a second microcontroller and generating a second output signal, the second output signal having a predetermined waveform and being generated as a function of a signal from the storage battery being processed by the second microcontroller, wherein the second microcontroller is programmed to form the predetermined waveform via a second waveform control signal, one a plurality of programs contained in the second microcontroller being selected via a selector device.

13. The solar power controller circuit according to claim 12, wherein the selector device includes a plurality of resistors connected in parallel with a power supply and one of a ground connection and a power supply connection.

14. A solar power generator system, comprising:
at least one solar cell, the at least one solar cell generating a first signal as a function of incident radiation;
a control circuit coupled to the at least one solar cell, the control circuit generates a second signal as a function of the first signal and processing the second signal via a microcontroller to generate a control signal, the control signal being provided to control charging of a battery connected to the control circuit, wherein the control circuit connects and disconnects the first signal to the battery at a predetermined rate;
an output control system coupled to the battery and to a set of light emitting diodes, the output control system controlling an operation of the light emitting diodes;
an ultrasonic receiver and an ultrasonic transmitter connected to the output control system, the ultrasonic receiver receiving an ultrasonic signal and causing, via the output control system, the ultrasonic transmitter to transmit an ultrasonic signal.

15. A synchronized lighting system, comprising:
a plurality of lighting devices, each of the plurality of lighting devices including
at least one solar cell, the at least one solar cell generating a first signal as a function of incident radiation,
a control circuit coupled to the at least one solar cell, the control circuit receiving the first signal and processing the first signal via a microcontroller to generate a second signal, the second signal being provided to control charging of a battery connected to the control circuit, wherein the control circuit connects and disconnects the first second signal to the battery at a predetermined rate,
an output control system coupled to the battery and to a set of light emitting diodes, the output control system controlling an operation of the light emitting diodes, and
an ultrasonic receiver and an ultrasonic transmitter connected to the output control system, the ultrasonic receiver receiving an ultrasonic signal and causing, via the output control system, the ultrasonic transmitter to transmit an ultrasonic signal;
wherein each of the plurality of lighting devices are synchronized by a first ultrasonic signal transmitted from a first of the plurality of lighting devices, the first ultrasonic signal triggering a next one of the plurality of lighting devices to initiate a cycle of operation of the light emitting diodes and to initiate a transmission of a second ultrasonic signal from the ultrasonic transmitter of the next one of the plurality of lighting devices.

16. A method for synchronizing a lighting system, comprising:
arranging a plurality of lighting devices, each of the plurality of lighting devices including
at least one solar cell, the at least one solar cell generating a first signal as a function of incident radiation,
a control circuit coupled to the at least one solar cell, the control circuit receiving the first signal and processing the first signal via a microcontroller to generate a second signal, the second signal being provided to control charging of a battery connected to the control circuit, wherein the control circuit connects and disconnects the first second signal to the battery at a predetermined rate,
an output control system coupled to the battery and to a set of light emitting diodes, the output control system controlling an operation of the light emitting diodes, and
an ultrasonic receiver and an ultrasonic transmitter connected to the output control system, the ultrasonic receiver receiving an ultrasonic signal and causing, via the output control system, the ultrasonic transmitter to transmit an ultrasonic signal;
transmitting a first ultrasonic signal from a first of the plurality of lighting devices;
receiving the first ultrasonic signal in a second of the plurality of lighting devices;
initiating a cycle of operation of the light emitting diodes in the second of the plurality of lighting devices as a function of the first ultrasonic signal;
initiating a transmission of a second ultrasonic signal from the second of the plurality of lighting devices as a function of the first ultrasonic signal; and
repeating the transmitting, receiving and initiating steps for each of the plurality of lighting devices, thereby synchronizing operation of each of the plurality of lighting devices.

17. The solar power generator system according to claim 1, further comprising:
a voltage sensor monitoring a voltage of the battery and generating a further voltage signal to the control circuit as a function of the voltage of the battery.

18. The solar power controller circuit according to claim 7, further comprising:
a voltage sensor monitoring a voltage of the battery and generating a further voltage signal to the control portion as a function of the voltage of the battery.

* * * * *